Patented July 27, 1954

2,684,908

UNITED STATES PATENT OFFICE 2,684,908

BLACK HECTOGRAPH PRINTING INK

Walter G. Drautz, Glenmont, N. Y., assignor to General Aniline & Film Corporation, New York, N. Y., a corporation of Delaware No Drawing. Application August 30, 1950,
Serial No. 182,414

9 Claims. (Cl. 106—22)

1

This invention relates to the production of duplicating inks for use in the hectographic process, and more particularly to a black ink of that type.

It is generally known in the art relating to hectograph duplicating materials that a black hectograph ink which will meet the requirements of repeated use is difficult to obtain. In order to be of value as a black hectograph ink it must be capable of printing a great many, as for example 150 to 200, copies in a good deep black shade from a single master copy, and the last print made should not differ greatly in shade from the first print. Some known compositions give good deep black prints originally, but on continued use the copies deteriorate to bluish, yellowish, or reddish shadings after about 20 copies have been made. This is due to the fact that a combination of spirit-soluble shading colors which blend to a shade approaching black is employed, as for example the soluble dyes Crystal Violet (salt of hexamethylpararosaniline), Brilliant or Ethyl Green (salt of tetraethyl diamidotriphenyl-carbinol), Magenta (mixture of pararosaniline and rosaniline), and Chrysoidine (salt of diamido azo benzene), of Patent No. 2,155,861. The uneven exhaust rates of these combined colors creates a progressive imbalance in the proportion of the colors necessary to blend to a black as the hectograph medium is used. Consequently, the color remaining in the largest proportion will predominate.

It has now been found that if a large percentage of Spirit Nigrosine is added to the shading dyes which combine to give a black color, a combination results which will produce a good black shade in many more copies without deterioration to one of the component colors. It is believed that as the shading colors become exhausted the black Spirit Nigrosine asserts its influence, preventing domination by any of the shading dyes and maintaining the black throughout.

In the preparation of this composition I mix Spirit Nigrosine RL (Nigrosine hydrochloride) (C. I. 864) with a mixture of Victoria Blue BA base (C. I. 729) or Methyl Violet A base (C. I. 680) and Bismarck Brown TSS base (C. I. 332) to which may be added Chrysoidine Y base (C. I. 20). To this mixture, which may be designated Mixture A, I add in approximately equal proportions a Mixture B comprising the water-soluble dyestuff salts Crystal Violet APX (C. I. 681), Victoria Pure Blue BGO (AATCC, 1947, page 236) and Chrysoidine RS (C. I. 21), either with or without the dye salts Euchrysine 3RXA (C. I. 788)

2 and Euchrysine 2 GA Conc. (AATCC, 1947, page 195).

The Spirit Nigrosine of the A Mixture is in large excess and preferably in the proportion of from 90 to 95 parts to from 10 to 5 parts of the black shading dyes. The mixing of the Spirit Nigrosine and the black shading dyes is effected in a volatile alcohol such as methyl, ethyl, propyl, and isopropyl alcohol. This alcohol-pasted mixture is then heated and a polyethylene glycol wax such as "Carbowax 4000," a commercial product having a M. P. range of 53.8 to 56.6° C. is added while heating. The heating is continued until the alcohol is evaporated. It is then solidified and ground.

The B Mixture is prepared by dissolving the component soluble dyes in water or alcohol, heating at from 100 to 130° C. and after it is thoroughly mixed, drying to a powder at about 130° C.

The complete mixing which results from the alcohol pasting and drying down of the A Mixture assists considerably in producing the blending of the Spirit Nigrosine and the black shading dyes necessary to produce good black prints for all copies throughout the life of the hectograph material. The heating of the B Mixture to 100 to 130° C. during the mixing is also an important feature which tends toward the formation of a more homogeneous dye powder, contributing toward the printing of even black shades throughout.

The following examples will serve to further illustrate the invention in its more specific aspects, it being understood that the conditions and proportions thereof do not constitute limitations, but illustrations:

MIXTURE A

*Example 1*

The following are mixed and dissolved in 300 parts methanol:

91 parts Spirit Nigrosine RL (C. I. 864)
1 part Victoria Blue BA Base (C. I. 729)
7 parts Chrysoidine Y Base (C. I. 20)
1 part Bismarck Brown TSS Base (C. I. 332)

This mixture is heated and then 120 parts of Carbowax 4000 are added with mixing. Heating is continued until the methanol has evaporated. The mix is then allowed to solidify and is ground to a powder.

In this example the methanol solvent may be replaced by ethyl alcohol, propyl alcohol, and isopropyl alcohol.

Example 2

The following are mixed and dissolved in 300 parts of methanol:

95 parts Spirit Nigrosine RL
3 parts Victoria Blue BA Base
2 parts Bismarck Brown TSS Base This mixture is heated and then 120 parts Carbowax 4000 are added with mixing. Heating is continued until the methanol has evaporated. The mix is then allowed to solidify and is ground to a powder.

Example 3

The following are mixed and dissolved in 300 parts of methanol:

90 parts Spirit Nigrosine RL
4 parts Chrysoidine Y Base
4 parts Bismarck Brown TSS Base
1 part Methyl Violet A Base (C. I. 680)

This mixture is heated and then 120 parts Carbowax 4000 are added with mixing. Heating is continued until the methanol has evaporated. The mixture is then allowed to solidify and is ground to a powder.

MIXTURE B

Example 4

The following components are combined with 150 parts water, or alcohol, if desired.

34 parts Chrysoidine RS (C. I. 21)
31 parts Crystal Violet APX (C. I. 681)
11 parts Victoria Pure Blue BGO (AATCC, 1947, page 236)
17 parts Euchrysine 3RXA (C. I. 788)
7 parts Euchrysine 2 GA Conc. (AATCC, 1947, page 195)

The mixture is heated and stirred until dissolved, and dried to a powder at 130° C.

Example 5

The following components are combined with 150 parts water, or alcohol.

45 parts Crystal Violet APX (C. I. 681)
5 parts Victoria Pure Blue BGO
50 parts Chrysoidine RS The mixture is heated and stirred until dissolved, and dried to a powder at 130° C.

50 parts of the composition of Mixture B of either Example 4 or Example 5 are ground and mixed with 50 parts of the composition of Mixture A of Examples 1, 2, or 3, to give a black dyestuff composition which yields homogeneous black prints during the entire printing life of the hectograph master copy.

I claim:

1. A black printing ink for hectographic transfer medium comprising a polyethylene glycol wax, about 45 to about 47½ parts of spirit-soluble Nigrosine and lesser amounts of a Bismarck Brown base, about 50 parts of a mixture comprising the water-soluble dyestuff salts Chrysoidine, Crystal Violet and Victoria Pure Blue and at least one member of the class consisting of a Methyl Violet base, a Victoria Blue base, and a Chrysoidine base, the total amount of said dyestuff bases being about 2½ to about 5 parts.

2. The ink of claim 1, containing a Victoria Blue base.

3. The ink of claim 2, containing a Chrysoidine base.

4. The ink of claim 1, containing a Methyl Violet base and a Chrysoidine base.

5. A black printing ink for hectographic transfer medium comprising a polyethylene glycol wax, about 45 to about 47½ parts of spirit-soluble Nigrosine and lesser amounts of a Bismarck Brown base, about 50 parts of a mixture comprising the water-soluble dyestuff salts Chrysoidine, Crystal Violet, Euchrysine and Victoria Pure Blue and at least one member of the class consisting of a Methyl Violet base, a Victoria Blue base, and a Chrysoidine base, the total amount of said dyestuff bases being about 2½ to about 5 parts.

6. The ink of claim 5, containing a Victoria Blue base.

7. The ink of claim 6, containing a Chrysoidine base.

8. The ink of claim 5, containing a Chrysoidine base and a Methyl Violet base.

9. The process of producing a black printing ink for hectographic transfer medium which comprises heating a mixture comprising about 45 to about 47½ parts of a spirit-soluble Nigrosine dye and lesser amounts of a Bismarck Brown base and at least one member of the class consisting of a Victoria Blue base, a Chrysoidine base, and a Methyl Violet base in a volatile aliphatic alcohol solvent, the total amount of said dyestuff bases being about 2½ to about 5 parts adding a polyethylene glycol wax having a melting point of from 53.8 to 56.6° C. while mixing, and continuing heating until solvent has evaporated off, dissolving about 50 parts of a second mixture of water-soluble black shading dyestuff salts comprising Chrysoidine, Crystal Violet and Victoria Pure Blue salts while stirring and heating at a temperature of from 100 to 130° C. and evaporating to dryness, and then mixing and grinding said first-named mixture with said second-named mixture.

References Cited in the file of this patent

UNITED STATES PATENTS

| Number | Name | Date |
| --- | --- | --- |
| 2,236,602 | Neidlick | Apr. 1, 1941 |
| 2,392,657 | Goepfert | Jan. 8, 1946 |
| 2,392,658 | Goepfert | Jan. 8, 1946 |
| 2,454,700 | Holik | Nov. 23, 1948 |

OTHER REFERENCES

"Synthetic Organic Chemicals," Carbide and Carbon Chemicals Corp. (1940), pp. 66 and 67.

Lesser, "Am. Ink Maker," June 1945, p. 21.